(12) United States Patent
Salmenkaita et al.

(10) Patent No.: US 8,005,046 B2
(45) Date of Patent: Aug. 23, 2011

(54) SYSTEM AND METHOD FOR DYNAMIC FREQUENCY ALLOCATION FOR PACKET SWITCHED SERVICES

(75) Inventors: Matti Salmenkaita, Malaga (ES); Jose Gimenez, Malaga (ES); Pablo Tapia Moreno, Malaga (ES)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 12/005,314

(22) Filed: Dec. 27, 2007

(65) Prior Publication Data
US 2008/0107074 A1    May 8, 2008

Related U.S. Application Data

(63) Continuation of application No. 10/140,102, filed on May 8, 2002, now abandoned.

(51) Int. Cl.
*G06F 15/16* (2006.01)
(52) U.S. Cl. ........ 370/330; 370/329; 370/332; 370/437; 370/443; 370/444
(58) Field of Classification Search .................. 370/329, 370/332, 437, 443–444
See application file for complete search history.

(56) References Cited

U.S. PATENT DOCUMENTS

| | | | |
|---|---|---|---|
| 6,223,041 B1 * | 4/2001 | Egner et al. | 455/452.2 |
| 6,987,753 B2 | 1/2006 | Liu et al. | |
| 6,990,348 B1 | 1/2006 | Benveniste | |
| 2002/0041566 A1 | 4/2002 | Yang et al. | |
| 2002/0145988 A1 * | 10/2002 | Dahlman et al. | 370/335 |
| 2003/0012217 A1 * | 1/2003 | Andersson et al. | 370/437 |
| 2003/0081547 A1 * | 5/2003 | Ho | 370/229 |
| 2003/0081568 A1 | 5/2003 | Shepherd | |
| 2003/0198200 A1 | 10/2003 | Diener et al. | |

FOREIGN PATENT DOCUMENTS

| | | |
|---|---|---|
| JP | 2002-511672 | 4/2002 |
| WO | WO 99/52307 | 10/1999 |

* cited by examiner

*Primary Examiner* — Jeffrey Pwu
*Assistant Examiner* — Sulaiman Nooristany
(74) *Attorney, Agent, or Firm* — Squire, Sanders & Dempsey (US) LLP (57) ABSTRACT

A system, method and computer program for dynamic frequency allocation for packet switched services in which radio channels used for packet switched services may be dynamically allocated to meet quality of service (QoS) requirements utilizing a dynamic frequency and channel allocation system. The achievable throughput is estimated in the available channels. Further, the user or application is able to specify the level of service desired and the system, method and computer program will select a channel assignment to meet the desired level of service. When the channels to be assigned have been selected, the system, method and computer program will evaluate if the new channel assignment will cause excessive interference to any other ongoing connection. In such case the ongoing connection will be re-assigned to another suitable radio channel.

18 Claims, 11 Drawing Sheets

SYSTEM AND METHOD FOR DYNAMIC FREQUENCY ALLOCATION FOR PACKET SWITCHED SERVICES

CROSS REFERENCE TO THE RELATED APPLICATION

This application is a Continuation of U.S. patent application Ser. No. 10/140,102, filed May 8, 2002, the entire disclosure of which is incorporated herein by reference.

FIELD OF THE INVENTION

The invention relates to a system and method for dynamic frequency allocation for packet switched services. More particularly, the invention is a system and method in which packet switched services may be dynamically allocated to meet quality of service (QoS) requirements utilizing a dynamic frequency and channel allocation system.

BACKGROUND OF THE INVENTION

Figure 1:
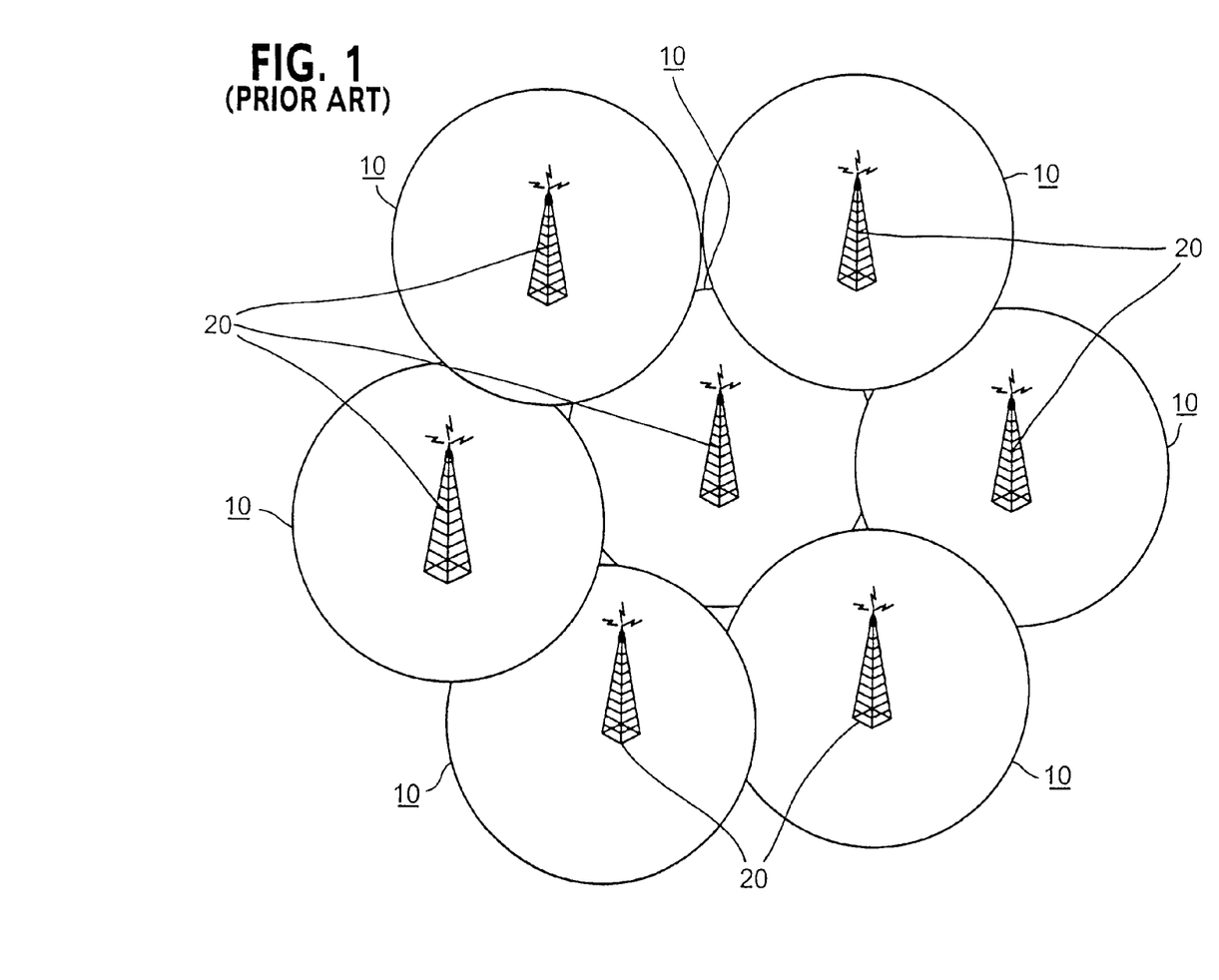
FIG. 1 is an example configuration of a cellular network.

Over the relatively short history of the deployment and availability of cellular telephones significant improvements have been seen in the quality of service as well as the exponential increase in usage. As illustrated in FIG. 1, cellular phone service providers have established cells 10 (also known as the base stations (BTS)) containing a transceiver 20 that transmits and receives signals to and from mobile stations (MS) (not shown). The cells 10 are configured so as to provide overlapping coverage with one another so that when mobile stations move from one cell 10 to another cell 10, the new cell 10 seamlessly continues (hands over) the connection between the mobile station and the cellular network. The mobile station 210 and transceiver 20 within a given time slot would utilize one frequency for transmission and another frequency for reception. The combination of the receiving frequency and the transmitting frequency as well as the time slot may be considered as a single channel. However, interference problems between nearby cells 10 would occur when the same or adjacent frequencies are utilized by mobile stations in each cell 10.

This interference is often represented by the carrier-to-interference ratio (C/I) which may also be referred to as the signal-to-noise ratio. When C/I is low this would indicate either the signal strength (C) is either low or the interference (I) is high or some combination of the two. However, a very high C/I level would lead to less capacity in the cellular network due to fewer available channels and would not necessarily improve QoS once the C/I level has obtained a certain minimum level.

In order to provide even levels of C/I for all mobile stations, cellular service providers have provided fixed frequency utilization plans that provide for a frequency hopping method to be allocated for each transceiver 20. During any given time slot through frequency and time division multiple access (TDMA) the C/I levels may be evened out within a cell 10. However, transceivers 20 do not base handover and power control decisions based on C/I levels. These decisions may often be based upon such variables as field strength and bit error rate. The transceiver may perform some C/I measurements, but these are limited to the receiving or uplink frequency. For nearby cells 10 only the field strength measurement of the broadcast control channel frequency is determined by the mobile station 210. Therefore, it was not possible for one cell to effectively control C/I levels, and thus quality of service, let alone the effects that interference from nearby cells 10 may have on one another.

One solution that improved QoS was disclosed in Nokia application number PCT/FI/99/00876, herein incorporated in its entirety by reference. This Nokia application provided for dynamic optimized channel allocation (DOCA). DOCA determines the C/I level for each mobile station and monitors it continuously that allows the cellular network to determine whether the C/I level is within a predetermined level. Handovers from one cell 10 to another are also based upon C/I criteria and thus the risk of service interruption is significantly reduced. However, with the exception of the broadcast control channel frequency, there is no actual frequency planning within the network and frequencies may be reserved as necessary to allocate channels and handovers as determined by the C/I analysis.

As the cellular industry has progressed no longer is cellular communications restricted to analog voice signals only. Today the mobile stations may be expected to carry circuit switched speech but also digital information such as voice over Internet protocol (VoIP), e-mail messaging, and full-scale Internet access. With this varying type of information that a cellular network must be able to handle so has come the need for the ability to adjust the C/I level according to the type of communications required. For example, in e-mail messaging a lower-level C/I level may be tolerated since the messages are usually short and communications speed is not absolutely critical. Further, as with any IP communications, error correction occurs within a packet and packet may be retransmitted when not received. However, any other forms of communications, such as voice, or where large volumes of data need to be transferred and received accurately, higher levels of C/I are required. Nokia application number PCT/FI/01114 dealing with dynamic frequency and channel allocation (DFCA), incorporated herein by reference, meets the needs of different users by selecting channels with the appropriate C/I level. DFCA dynamically maintains a matrix of the quality of connection (C/I level) of all possible channels that may be allocated. This matrix enables the selection of a channel having a C/I level which can best fit the user needs. Further, as other mobile stations are allocated channels in nearby cells 10 it is determined the impact that such allocation may have on already established communications channels.

However, even though DFCA is able to provide a good QoS and maximize the possible number of channels within a cell 10 a great deal of bandwidth is still under utilized in a circuit switched system. In many instances involving packet transmission as in an IP network, the number packets transmitted and their size is relatively small. This is particularly evident in e-mail transmission to and from a cellular phone and may be the case in VoIP communications. Further, in VoIP communications there may be periods in which no packets are transmitted since no one is speaking. Therefore, dedicating a channel for transmission of a relatively small or infrequent number of packets would defeat the advantages seen in an IP network through shared communications. In an IP network, packets from different sources and users are transmitted over the same channel or communications line to a destination that reassembles the appropriate packets to form the message. Therefore, the communications line or channel is more fully utilized through the sharing mechanism. However, in the case where large amounts of data must be transmitted in the fastest possible means it would be desirable to be able to provide a dedicated channel or channels with high C/I values for maximum throughput.

Therefore, what is needed are a system and method that can determined the QoS required by a mobile station and determine if sharing a channel with other mobile stations would meet the QoS required. Further, when a mobile station requires very high throughput this system and method should dedicate a channel with a high C/I value in order to maximize throughput. Therefore, the resources of the cellular network should be maximized to handle the largest number of mobile stations while at the same time meeting the QoS requirements of any given mobile station.

SUMMARY OF THE INVENTION

An embodiment of the present invention provides for a system and computer program for dynamic channel allocation for packet switched services. This system and computer program has a quality of service management module to monitor requests for channel assignment from a mobile station and to control the channel assignment process using throughput estimation and outgoing interference evaluation modules. The quality of service module determines based on the traffic class type and the throughput estimations if the connection can be established using shared radio channels within the shared territory or if the connection must be established using dedicated channels provided in the dedicated territory. The throughput estimation module is used to determine the available user throughput in available radio channels based on the estimated C/I ratio the user would experience in different radio channels and the existing resource usage on the same radio channels. The outgoing interference evaluation module is used to determine the effect of the channel assignment upon other dedicated channels already assigned within nearby cells based upon a C/I ratio. When required, the outgoing interference evaluation module triggers handovers in order to move endangered connections on dedicated channels that may be adversely affected by the new channel to other dedicated or shared channels.

Further, an embodiment of the present invention is a method of dynamic channel allocation for packet switched services. This method starts by allocating frequencies to a plurality of transceiver units within cells based upon calculating a C/I ratio for the cell with the addition of each frequency or by any other channel allocation method that aims to minimize the interference in the network. These assigned frequencies are to be used in the shared territory time slots whenever the transceiver unit carries shared territory time slots. Transmitting the frequencies to each of the plurality of transceiver units. Receiving a request for a channel assignment from a mobile station. Then determining a traffic class type for the channel assignment, wherein the traffic class type is either best effort or guaranteed throughput. Estimating the available user throughput based upon a C/I ratio for the channel assignment in the available shared territory radio channels and assigning the connection to a shared radio channel with the best throughput if the traffic class is best effort. Further, assigning the channel assignment to a dedicated channel when the traffic class type is guaranteed throughput and a shared channel assignment would generate inadequate throughput for the mobile station. Rejecting the channel assignment and triggering a re-negotiation of the quality of service parameters when the required throughput rate cannot be achieved in the available shared or dedicated channels when the traffic class type is guaranteed throughput. In all cases, evaluating the outgoing interference that may result from the channel assignment in the shared or the dedicated territory based upon the C/I ratio that the affected dedicated territory connections in nearby cells are estimated to be subjected to as a result of the channel assignment. Relocating the affected connections to other channels by means of handovers or rejecting the channel assignment when the estimated resulting C/I ratio does not exceed a predetermined value that may depend on the quality of service requirements of each affected connection.

These and other features of this device, method and computer program will become more apparent from the following description when taken in connection with the accompanying drawings that show, for purposes of illustration only, examples in accordance with the present invention. The computer program may be stored on a computer readable medium that is a non-transitory computer readable medium.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

Figure 2:
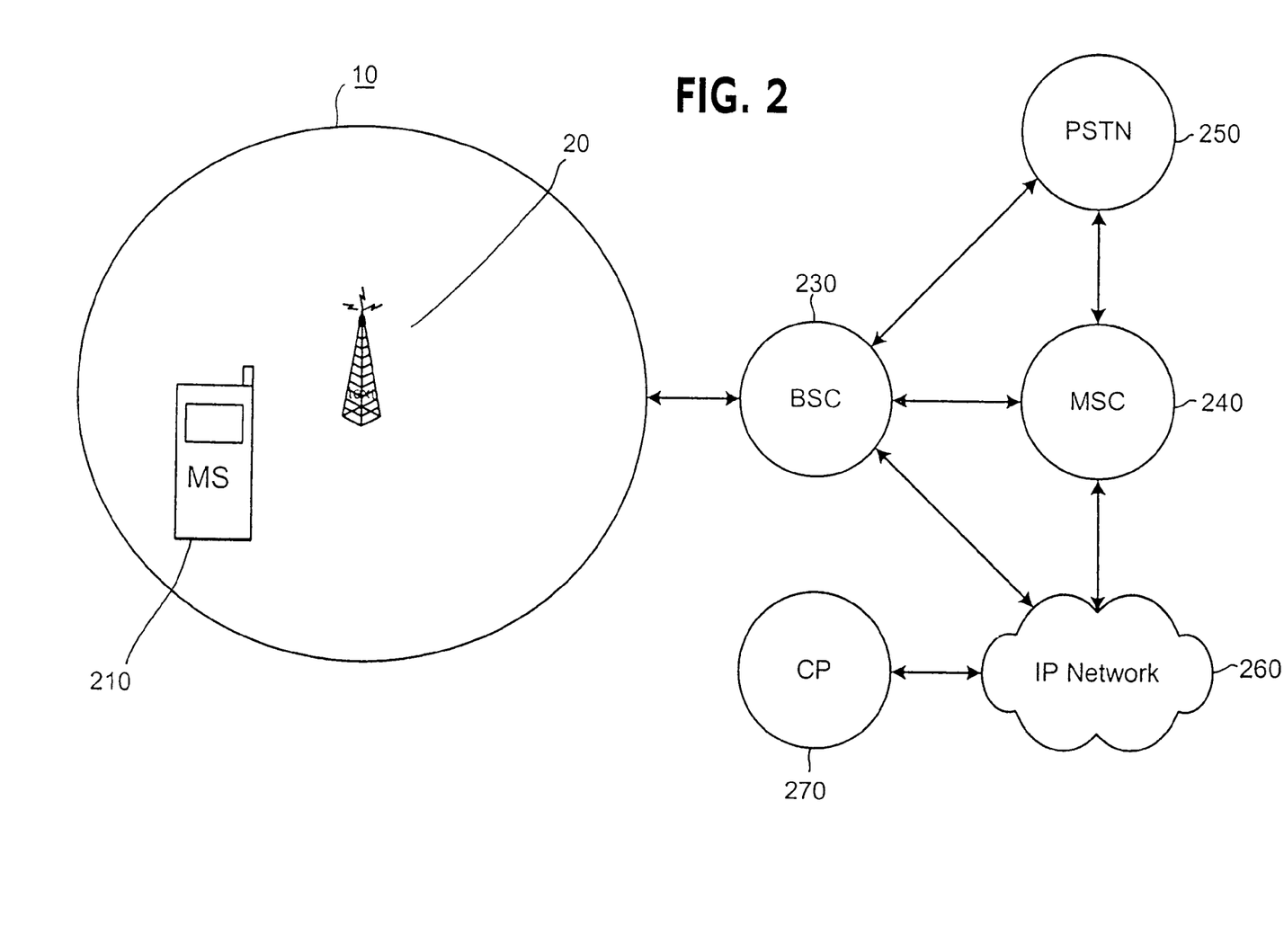
FIG. 2 is a systems architecture diagram in an example embodiment of the present invention.

FIG. 2 is a systems architecture diagram in an example embodiment of the present invention. As previously discussed cell 10 contains a transceiver 20 which may communicate with a mobile station 210 that is in range of transceiver 20. Cell 10 is controlled by a base station controller (BSC) 230 that determines how the transceivers transmissions must be adjusted to align all transmissions within a time slot. This would thereby synchronize the entire cellular network, as exemplified and illustrated in FIG. 1. In turn one or more base station controllers 230 would be connected to a mobile switching center (MSC) 240 that enables a mobile station 210 to communicate to another mobile station 210 in another cell 10 or to a telephone or other device connected to the public switched telephone network (PSTN) 250 or an Internet protocol (IP) network 260 such as but not limited to the Internet. In turn the IP network 260 would be connected to a content provider (CP) 270 which would supply content desired by the user of the mobile station 210. As would be appreciated by one of ordinary skill in the art, the precise configuration illustrated in FIG. 2 may vary dependent upon the complexity of the cellular network. For example, it may be possible to eliminate or reduce the number of MSC's 240 and have a BSC 230 directly communicate to the PSTN 250 or the IP network 260.

Figure 3:
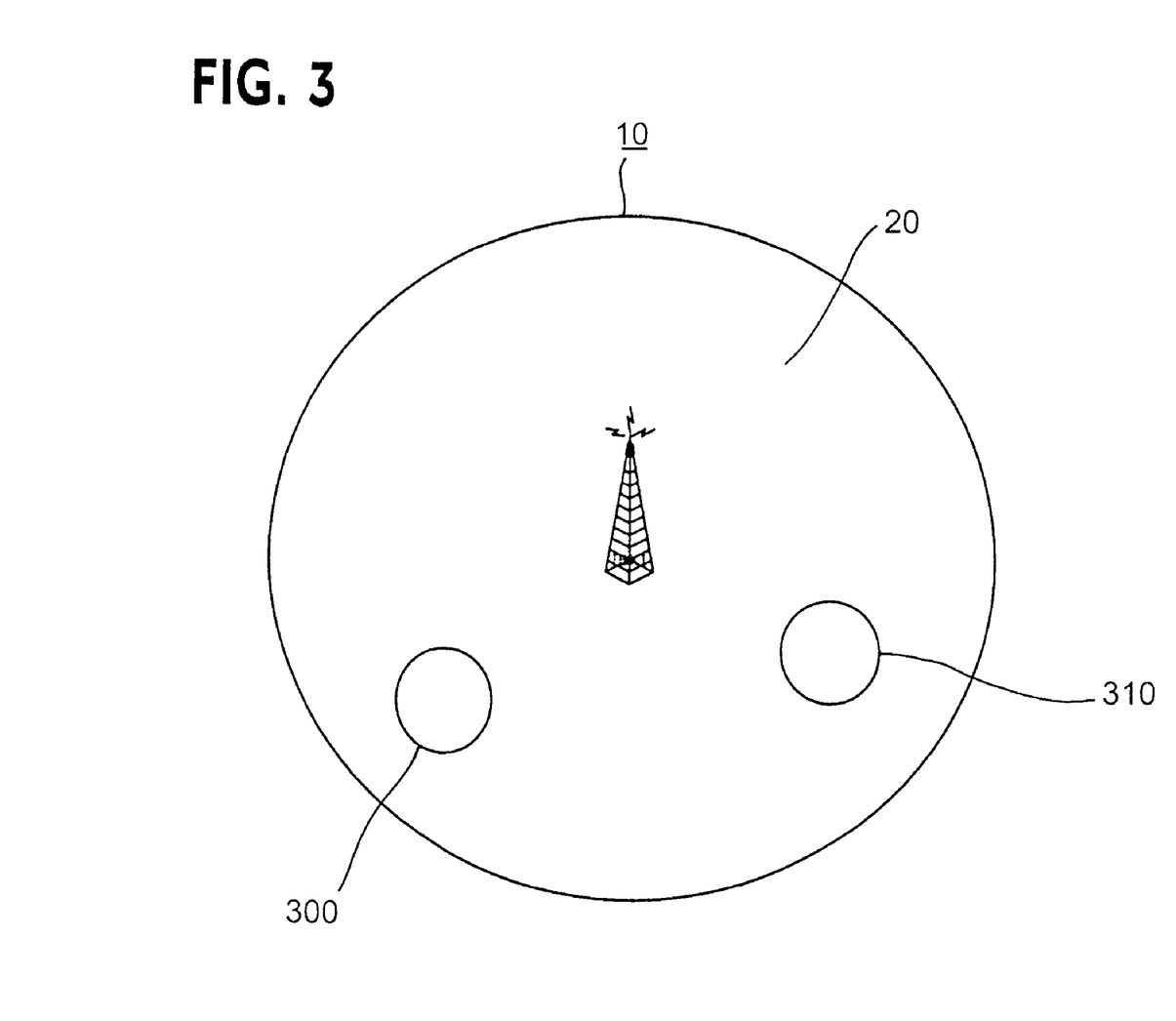
FIG. 3 is an illustration of a cell having two different C/I levels associated with mobile stations in an example embodiment of the present invention.

FIG. 3 is an illustration of a cell 10 having two different C/I levels 300 and 310 associated with mobile stations 210 in an example embodiment of the present invention. This illustration is provided to show that C/I levels may be located physically anywhere within a cell 10. The determination whether a particular C/I level 300 or 310 is high or low is based upon transceiver 20 in conjunction with BSC 230 and any interference received from nearby cells 10.

Figure 4:
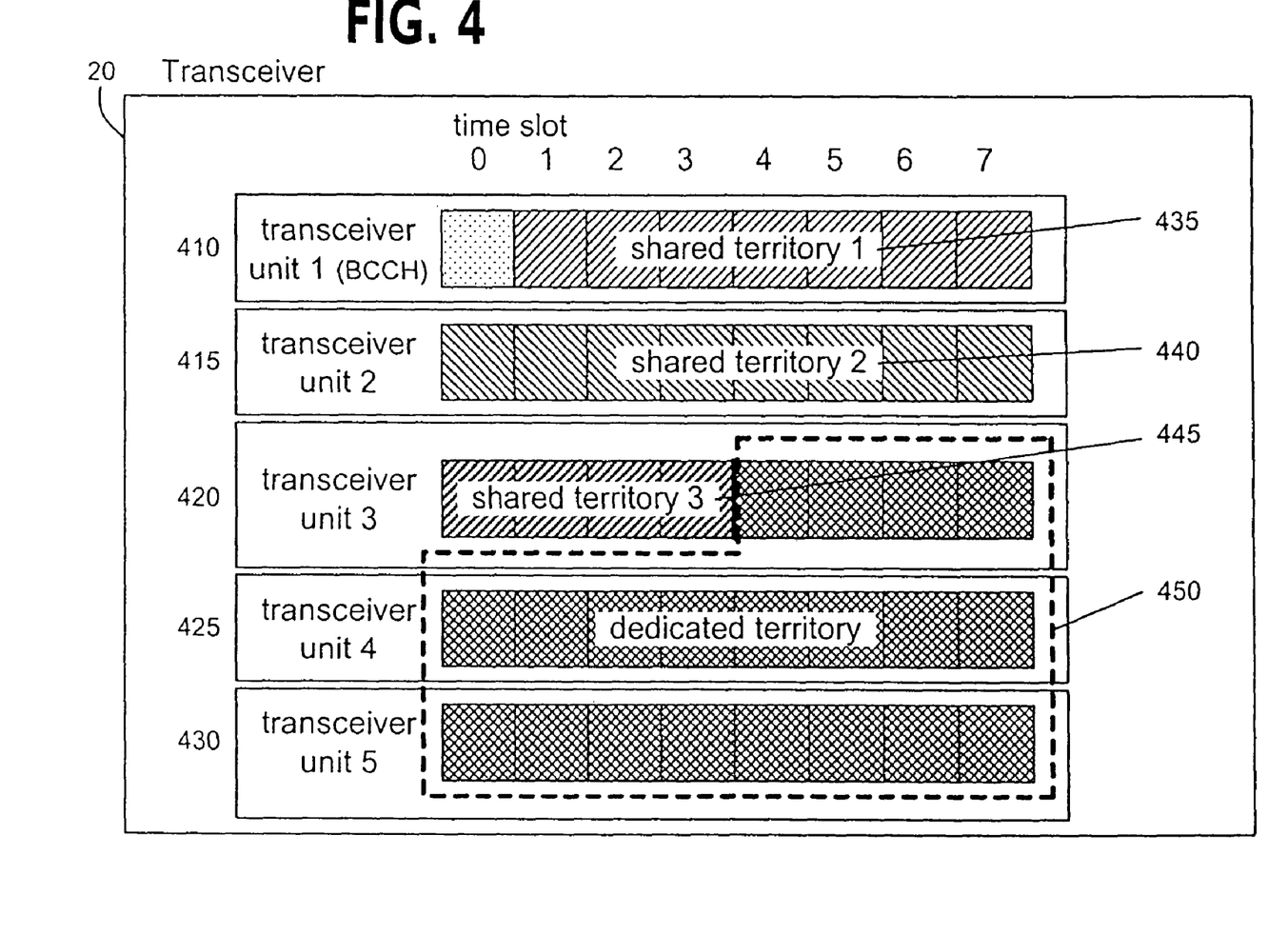
FIG. 4 is an illustration of the radio resource management strategy diagram based on the shared and dedicated channel territories within the transceiver units.

FIG. 4 is an illustration of the transceiver 20 comprising of multiple transceiver units each providing a carrier frequency used in the cell that is further divided into several time slots that all together constitute a TDMA frame. Each time slot within each transceiver unit 410 to 430 may belong to one of the shared territories 435 to 445 or to the dedicated territory 450. For all shared territory time slots each transceiver unit uses the pre-allocated frequency that has been assigned to it by the frequency assignment module 510 shown in FIG. 5. For each of the dedicated territory time slots each transceiver unit will use the dynamically assigned frequency that has been selected based on the C/I estimations by the DFCA algorithm. The shared territory time slots together with the pre-allocated frequency form a set of shared radio channels that can be assigned to several mobile stations 210 simultaneously. Typically the usage of the shared radio channel is controlled by a packet scheduling function that decides which user data is to be transmitted on the shared channel at any one time. The shared channels are advantageous as the multiplexing of several data streams provides the possibility to achieve a very efficient use of the radio resource. However, since the shared channels use a pre-allocated frequency the C/I in each shared territory time slot is fixed. This, and the time slot capacity used to serve existing connections on the shared territory may in some cases make it impossible to achieve the required throughput. In this kind of situation the dedicated territory may be utilized for the connection. A dedicated territory time slot can be used for only one connection at the time and it does not have a pre-allocated frequency associated with it. Instead, the frequency used In the dedicated territory time slot is selected from the available frequency band by the DFCA algorithm so that the C/I can be maximized. This generally leads to a better possibility to find a radio channel with sufficient C/I in order to provide the required throughput. This is further helped by the fact that the dedicated territory time slots are dedicated to one connection only, so the whole time slots capacity is available to the user. In addition to the selected packet switched data connections, all the circuit switched speech and circuit switched data connections are assigned to the radio channels in the dedicated territory by the DFCA algorithm based on the C/I criteria.

Figure 5:
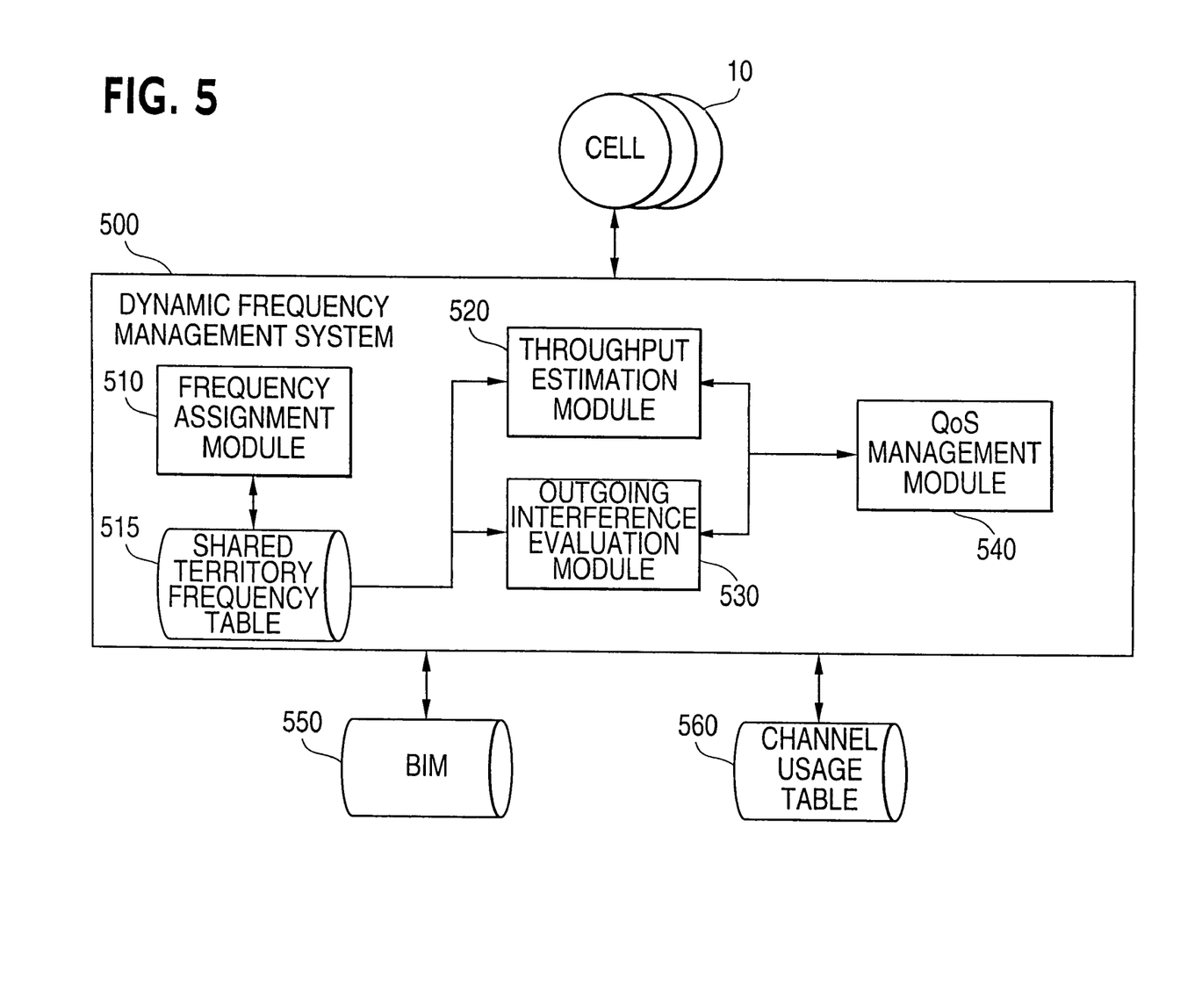
FIG. 5 is an example modular configuration diagram of the dynamic frequency management system employed in an example embodiment of the present invention.

The modular configuration diagrams shown in FIG. 5 as well as the flowcharts shown in FIGS. 6 through 11 contain software, firmware, hardware, processes or operations that correspond, for example, to code, sections of code, instructions, code segments, commands, objects, or the like, of a computer program that is embodied, for example, on a storage medium such as floppy disk, CD Rom, EP Rom, RAM, hard disk, etc. Further, the computer program can be written in any language such as, but not limited to, for example C++.

Figure 6:
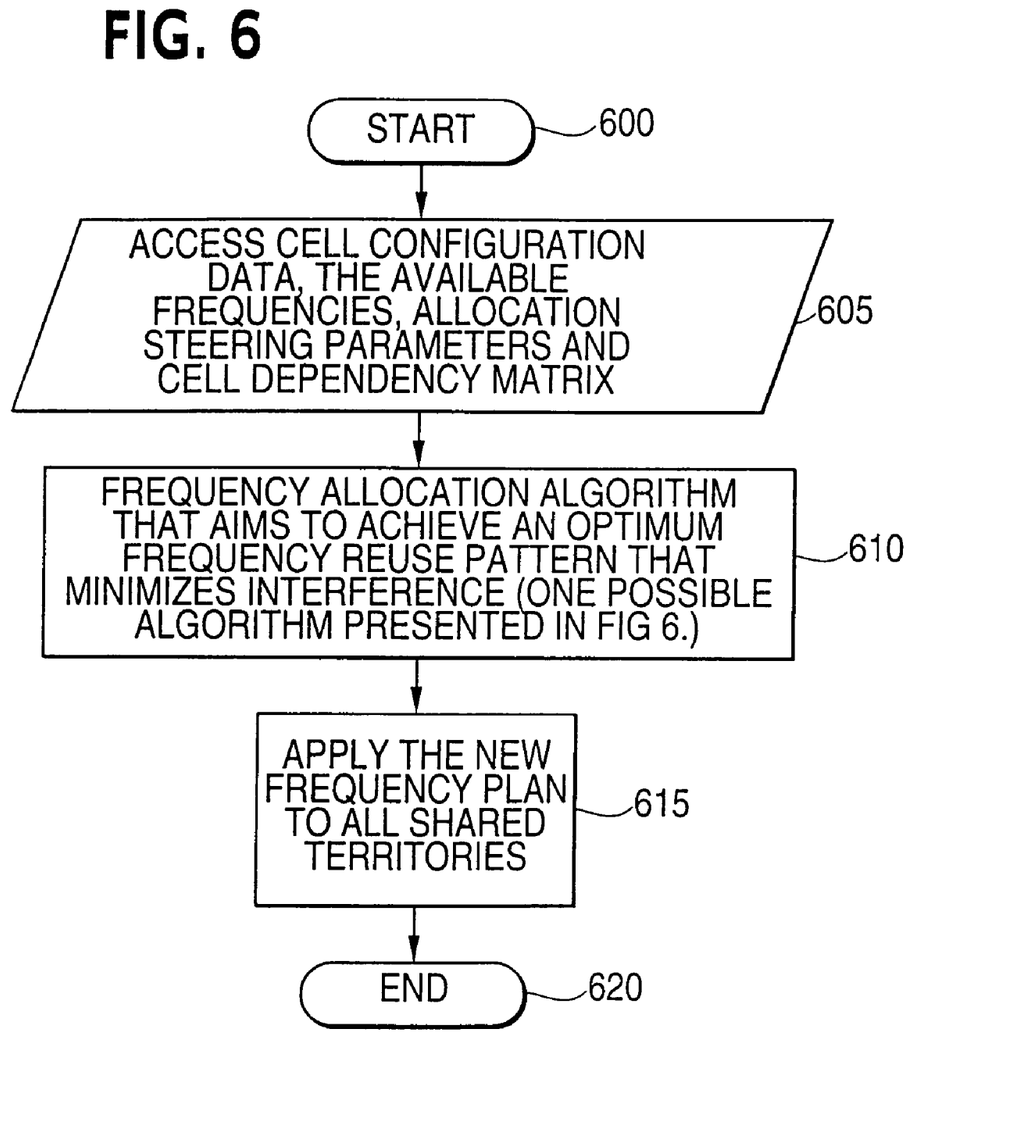
FIG. 6 is an example flowchart illustrating the operations performed by the frequency assignment module 510, shown in FIG. 5.

FIG. 5 is an example modular configuration diagram of the dynamic frequency management system 500 employed in an example embodiment of the present invention. The dynamic frequency management system 500 is utilized to control channel assignment in a plurality of cells 10 so as to provide a maximum number of mobile stations 210 access to the cellular network while maintaining an appropriate level of QoS using dedicated and shared channels. The dynamic frequency management module 500 comprises at least four major modules and is utilized to assign frequencies/channels to mobile stations 210, determine estimated throughput availability and outgoing interference, and based on that estimated throughput and outgoing interference as well as the quality of service desired establish the appropriate channel connection. A frequency assignment module 510, as discussed in further detail with respect to FIG. 6, is utilized to assign shared territory frequencies for each transceiver unit 410 to 430 in each respective cell 10 from the frequency pool available. The resulting shared territory frequencies are stored in the shared territory frequency table 515. The throughput estimation module 520, as discussed in further detail with respect to FIG. 9, would monitor any incoming interference and the existing time slot capacities to derive a throughput estimations that may affect a new channel assignment for a mobile station 210. The outgoing interference evaluation module 530, as discussed in further detail with respect to FIG. 11, would evaluate the outgoing interference that may affect any dedicated territory channels assigned in any nearby cells 10. The QoS management module 540, as discussed in further detail with respect to FIG. 8, would determine the type of service required by a particular mobile station 210 and select from the available channels in order to provide the QoS desired. The dynamic frequency management module 500 in turn interfaces to and updates a background interference matrix (BIM) 550 and a channel usage table 560. Network configuration data, frequency allocations and steering parameters may be contained in another database. The BIM 550 contains measurement based statistical C/I values that represent statistically expected C/I values between any two cells in the network. This statistical C/I data forms a cell dependency matrix that can be used as an input for the frequency assignment module.

FIG. 6 is an example flowchart illustrating the operations performed by the frequency assignment module 510, shown in FIG. 5. The frequency assignment module 510 begins execution in operation 600 and immediately proceeds to operation 605. In operation 605 the BIM 550 is accessed to determine the cell dependency matrix and other suitable database is accessed to determine the cell 10 and transceiver 20 configuration data, the frequencies available and allocation steering parameters. Operation 610 comprises of an execution of a frequency allocation algorithm that assigns the available frequencies to the transceiver units 410 to 430 in FIG. 4. in a way that aims to minimize the interference in the network. These assigned frequencies are then used for the shared territory time slots within each transceiver unit. The frequency allocation algorithm may be implemented in many ways and several well known solutions exist. Once the frequency allocation algorithm 610 has been executed, then processing proceeds to operation 615, where the frequency parameters are transmitted to each cell 10 and transceiver 20 within the cellular network. Thereafter, processing proceeds operation 620 where processing terminates.

Figure 7:
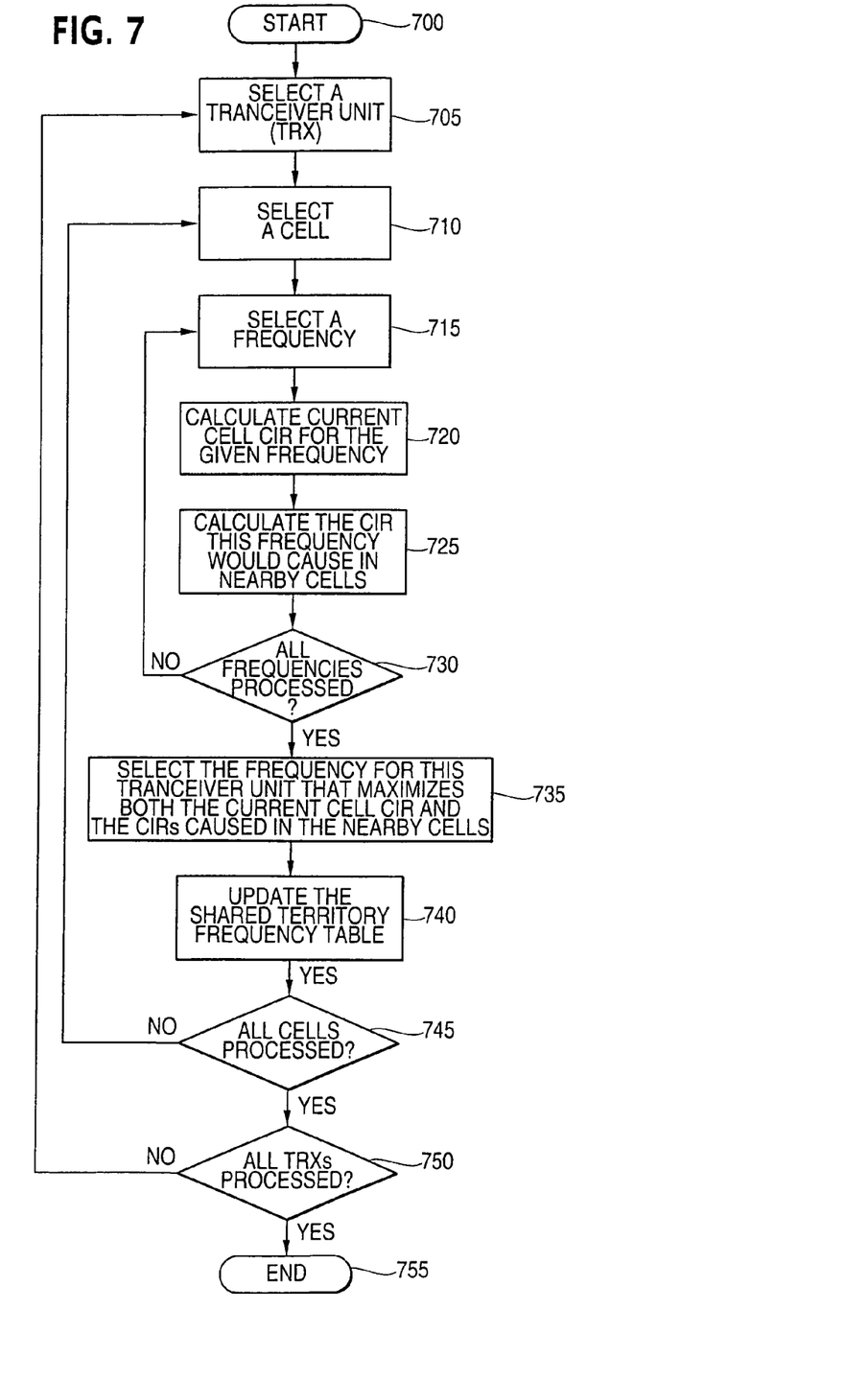
FIG. 7 is an example flowchart illustrating one possible frequency allocation algorithm i.e. the operations performed in the block 610, shown in FIG. 6.

FIG. 7 presents an example flowchart of a possible frequency allocation algorithm that may be used to realize the operation required in block 610 in FIG. 6. The frequency allocation algorithm begins execution in operation 700. Thereafter, in operation 705 a transceiver 20 TRX is selected. Thereafter in operation 710 a cell 10 is selected and in operation 715 a frequency pair comprising a sending and receiving frequency, is selected. In operation 720, a C/I ratio is calculated for the selected frequency within the particular cell 10. Thereafter, in operation 725 all nearby cells are checked for possible interference due to the possible allocation of the frequency within this particular cell 10. Operation 730 comprises of a check if all available frequencies have been evaluated. If not, the execution returns to operation 715. If all available frequencies have been processed then execution proceeds to operation 735. In operation 735 the frequency pair that minimizes the interference in the network is selected. Processing then proceeds to operation 740 where the shared territory frequency table is updated with the selected frequency. Processing then proceeds to operation 745 where it is then determined if all cells 10 have been processed. If all cells 10 have not been processed then processing loops back to operation 710. Thereafter, if all cells 10 have been processed then processing proceeds to operation 750 where it is determined if all transceiver 20 units have been processed. If all transceiver units have not been processed then processing loops back to operation 705. Otherwise, processing proceeds to operation 755 where processing terminates.

Figure 8:
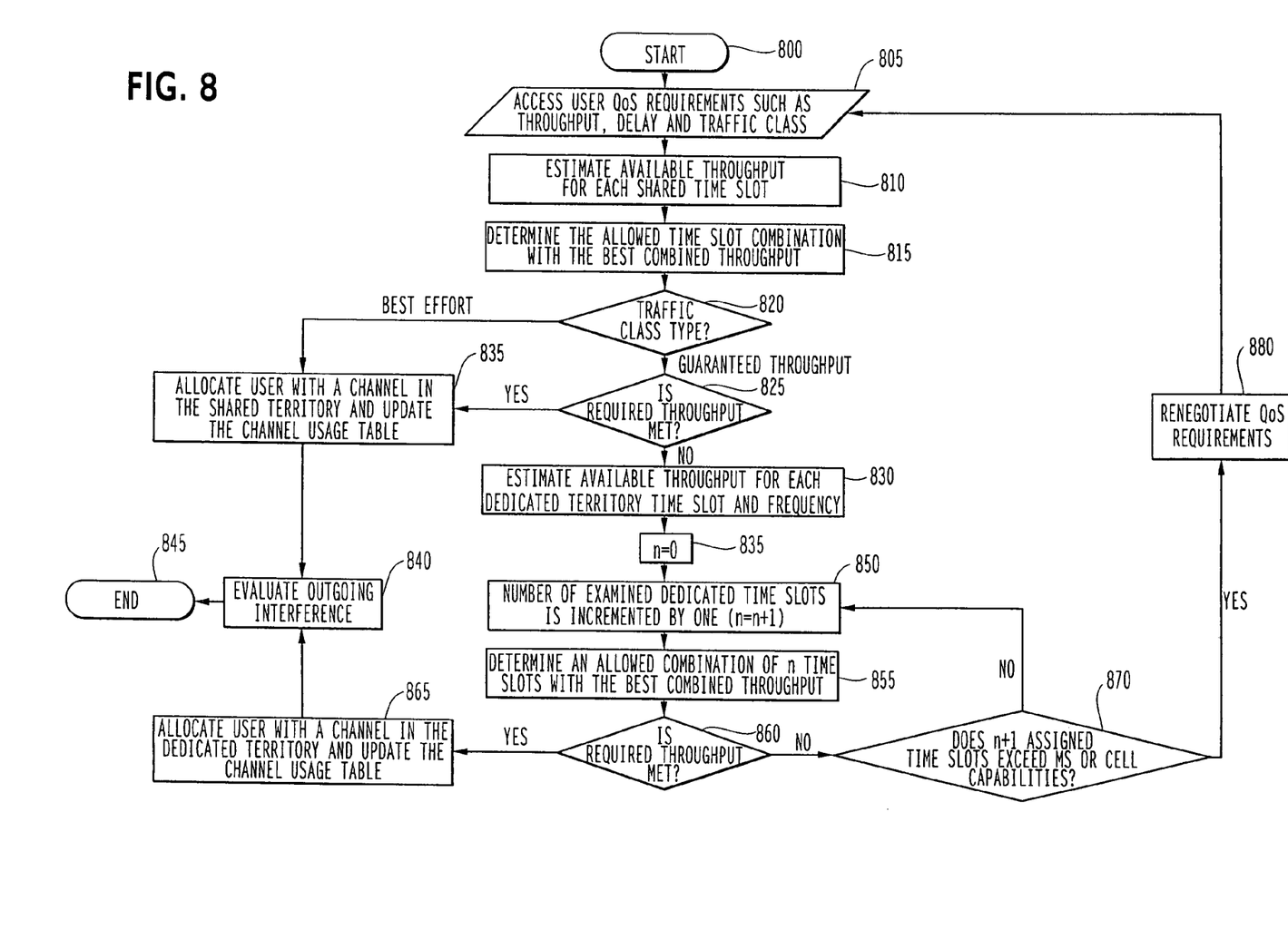
FIG. 8 is an example flowchart illustrating the operations performed by the QoS management module 540, shown in FIG. 5.

FIG. 8 is an example flowchart illustrating the operations performed by the QoS management module 540, shown in FIG. 5. The QOS management module 540 begins processing in operation 800 and immediately proceeds to operation 805. In operation 805 the user's QoS requirements, such as throughput as well as the delay and traffic class are accessed. In operation 810, the available throughput is checked for all the available shared time slot (TSL) combinations that are supported by the mobile station 210 and the network. The throughput estimation procedure 810 is presented with more detail in FIG. 9. Thereafter in operation 815 the allowed time slot combination with the best throughput is selected. Processing then proceeds to operation 820 where the traffic class type is determined. In this embodiment, two possible traffic classes are provided. Specifically, best effort throughput and guaranteed throughput. However, as would be appreciated by one of ordinary skill in the art any number of traffic classes may be created dependent upon the needs of the user and the capabilities of the cellular network.

Still referring to FIG. 8, if the traffic class provides for guaranteed throughput then processing proceeds to operation 825. In operation 825 it is determined if the throughput requirement is met. If the throughput requirement is met, then processing proceeds to operation 835. In addition, if the traffic class is a best effort throughput type, then processing proceeds to operation 835 also. In operation 835 the connection is assigned to the previously determined shared territory allowed time slot combination that provides the highest throughput and the channel usage table 560 in FIG. 5 is updated accordingly. Thereafter, processing proceeds to operation 840 where the outgoing interference caused by the new channel assignment is evaluated. If the new assignment is found to cause excessive interference to any existing connection in nearby cells, the existing connection is relocated to another radio channel by handover procedure. The outgoing interference evaluation procedure 840 is presented in more detail in FIG. 11. After the outgoing interference has been evaluated the execution proceeds to operation 845 where the channel assignment procedure for the packet switched connection ends.

Still referring to FIG. 8, if in operation 825 the throughput is not met then processing proceeds to operation 830. In operation 830 the available user throughput is estimated in all available dedicated territory time slots for all available frequencies. This operation 830 is described in further detail in FIG. 9. The execution then proceeds to operation 835 where the time slot counter n is reset. This is followed by operation 850 where the number of dedicated territory time slots to be considered for allocation n is incremented by one. Processing then proceeds to operation 855 where the best available throughput using a supported configuration of n time slots for the radio channel is determined based on the throughput estimations obtained previously in operation 830. Thereafter, in operation 860, it is determined if the throughput requirement is met. If the throughput requirement is met in operation 860 then processing proceeds to operation 865 where the channel is allocated in the dedicated territory using n time slots and the channel usage table 560 in FIG. 5 is updated correspondingly. Thereafter, processing proceeds to operation 840 where the outgoing interference is evaluated as described before and finally the processing proceeds to operation 845 where processing terminates.

Still referring to FIG. 8, if in operation 860 it is determined that throughput cannot be met then processing proceeds to operation 870. In operation 870 it is determined whether the number of required timeslots exceeds the capacity/capabilities of the mobile station 210 or the cell 10. If the number of timeslots required do not exceed such capabilities then processing returns to operation 850. However, if the number of timeslots required do exceed such capabilities then processing proceeds to operation 880 where the quality of service requirements requested are renegotiated. This may entail requesting the user or an application requiring the information transfer within the mobile station 210 or on the network side to accept, at least temporarily, a lower than desired level of service. Thereafter, processing returns to operation 805.

Figure 9:
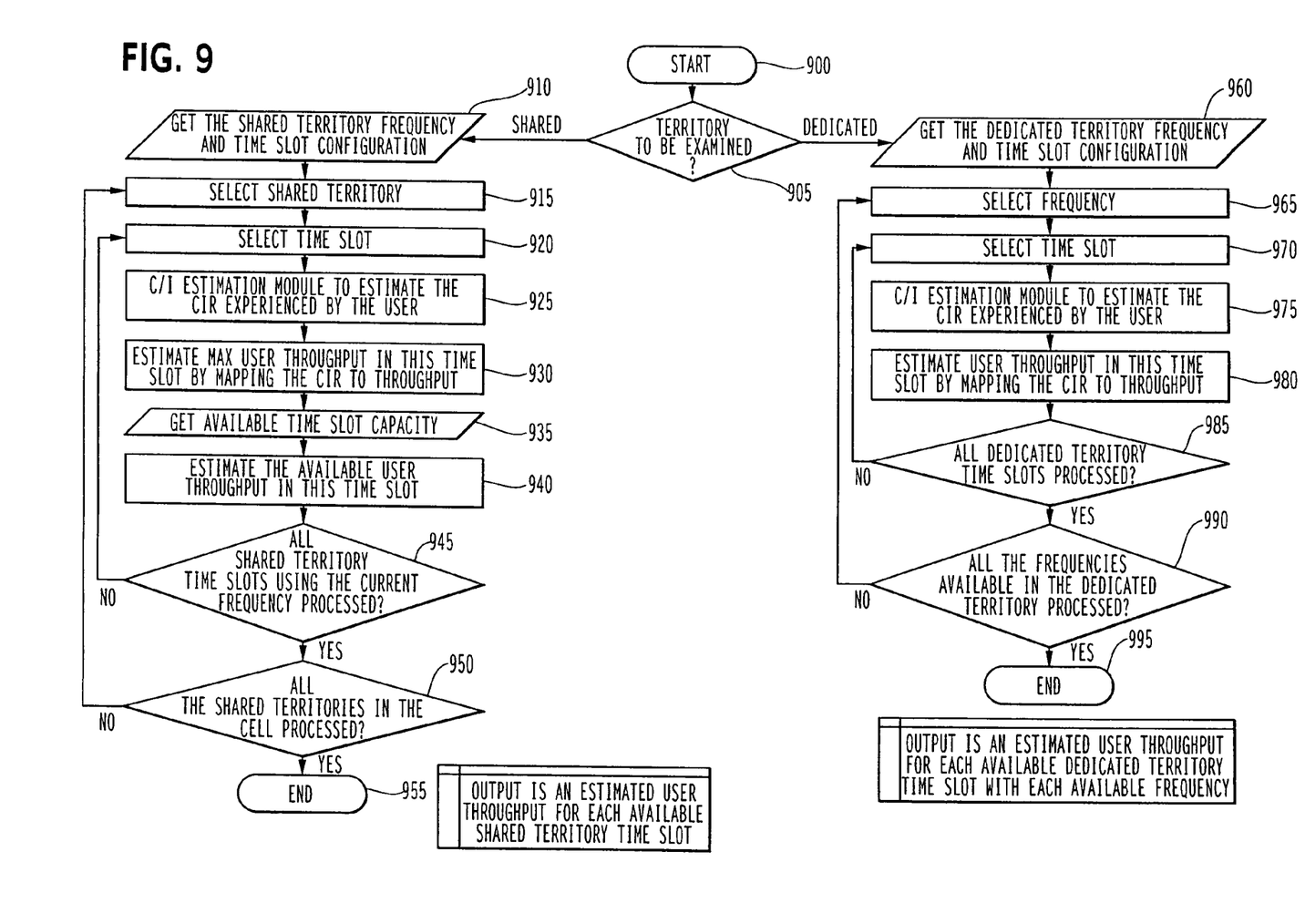
FIG. 9 is an example flowchart illustrating the operations performed by the throughput estimation module 520, shown in FIG. 5.

FIG. 9 is an example flowchart illustrating the operations performed by the throughput estimation module 520, shown in FIG. 5. The throughput estimation module 520 begins execution in operation 900 and immediately proceeds to operation 905. In operation 905, the territory for which the throughput estimation is to be performed is checked. If the territory to be evaluated is a shared territory then the processing proceeds to operation 910. In operation 910 the shared territory frequency table 515 and the channel usage table 560 are accessed to retrieve information indicating which time slots in the cell 10 are currently belonging to the shared territory and what are the pre-allocated shared territory frequencies used in those time slots. Processing then proceeds to operation 915 where one of the shared territories in the current cell 10 is selected for examination. Processing then proceeds to operation 920 where one of the time slots within the selected shared territory is selected for examination. Thereafter, the processing proceeds to operation 925 where the C/I that the user would be subjected to in the current time slot is estimated. The C/I estimation procedure in operation 925 is discussed in more detail in FIG. 10. The processing then proceeds to operation 930 where the estimated C/I is used to derive an estimation of the maximum available throughput that could be achieved in this time slot. This estimation can be achieved for example by utilizing C/I in throughput mapping tables. This operation is followed by operation 935 where the channel usage table 560 is accessed to determine how much of the time slot resource is already being utilized by other connections sharing the same time slot. Thereafter, processing proceeds to operation 940 where the estimated maximum time slot throughout is adjusted by taking into account the share of the time slot resources already being used by other connections. As a result an estimate of the available user throughput in the current time slot is derived. Execution then proceeds to operation 945 where it is determined if all the time slots within the current shared territory have been examined. If all the time slots in the current shared territory have not been processed then the processing returns to operation 920, otherwise processing proceeds to operation 950. In operation 950 it is determined if all the shared territories in the current cell 10 have been processed. If all the shared territories in the current cell 10 have not been processed then the processing returns to operation 915, otherwise execution proceeds to operation 955 where it terminates.

Still referring to FIG. 9, if in operation 905 it is determined that the throughput estimation is to be performed to a dedicated territory then processing proceeds to operation 960. In operation 960 the channel usage table 560 is accessed to retrieve information indicating which time slots in the cell 10 currently belong to the dedicated territory and what are the frequencies allowed to be used for dedicated territory connections in the current cell 10. Processing then proceeds to operation 965 where one of the frequencies available for usage in the dedicated territory is selected for evaluation. Thereafter processing then proceeds to operation 970 where one of the available dedicated territory time slots is selected for evaluation. Processing then proceeds to operation 975 where the C/I that the user would be subjected to in the current time slot is estimated. The C/I estimation procedure in operation 975 is discussed in more detail in FIG. 10. Thereafter, the processing proceeds to operation 980 where the user throughout is estimated based on the previously estimated C/I ratio. This can be performed for example by utilizing C/I in throughput mapping tables. The processing then proceeds to operation 985 where it is determined if all dedicated territory time slots in the current cell have been processed. If all the dedicated territory time slots in the current cell have not been processed then the processing returns to operation 970. If all the dedicated territory time slots in the current cell have been processed then execution proceeds to operation 990. In operation 990 it is determined if all the frequencies available for dedicated territory in the current cell 10 have been processed. If all such frequencies have not been processed then processing returns to operation 965, else the processing proceeds to operation 995 where it is terminated.

Figure 10:
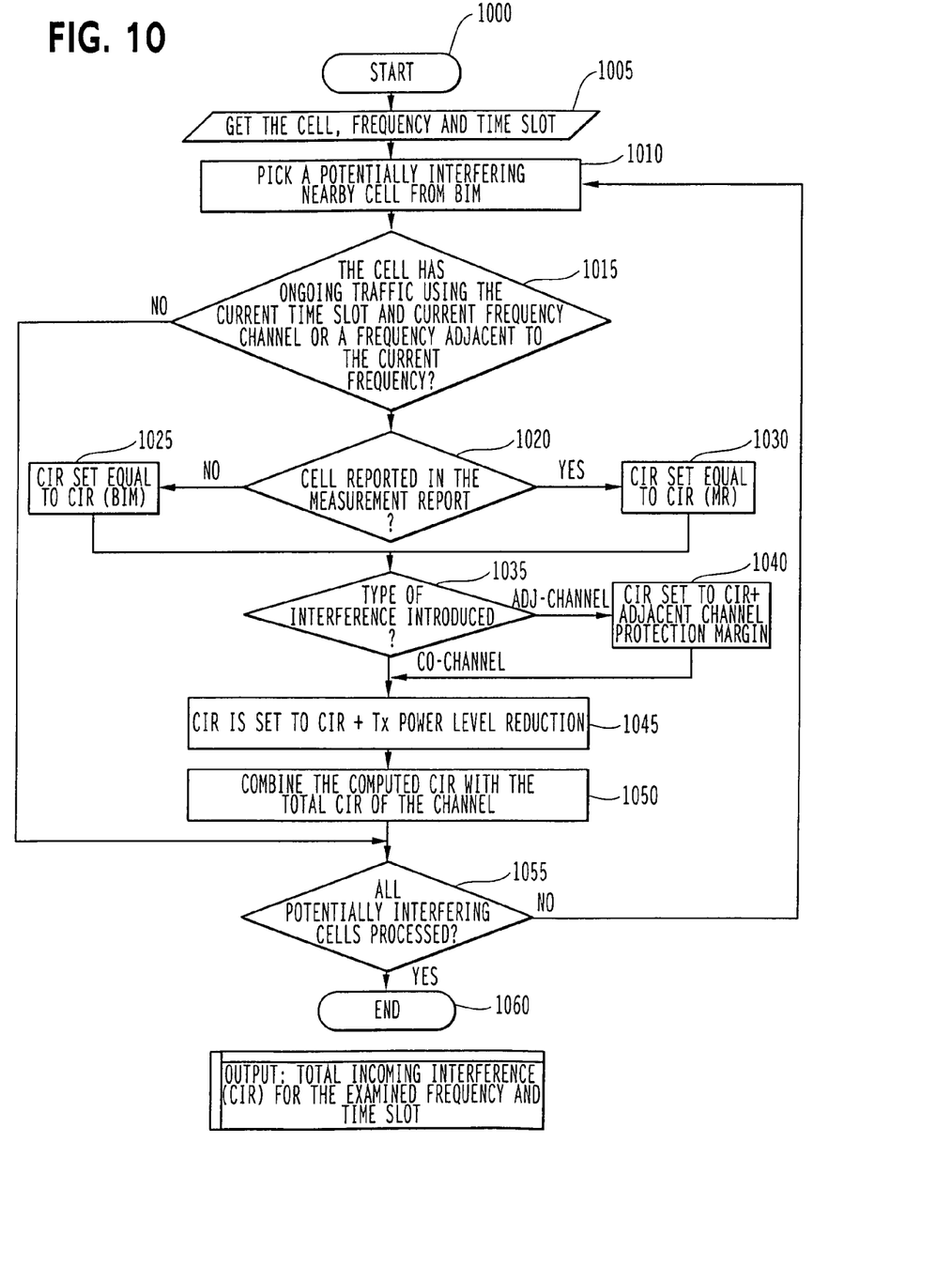
FIG. 10 is an example flowchart illustrating the operations performed in the C/I estimation module in block 925 and 975 shown in FIG. 9.

FIG. 10 is an example flowchart illustrating the operations performed by the C/I estimation module illustrated in operations 925 and 975, shown in FIG. 9. The C/I estimation module begins execution in operation 1000 and immediately proceeds to operation 1005. In operation 1005 the information of the current frequency and the current time slot that are to be evaluated are accessed. Processing then proceeds to operation 1010 where a potentially interfering nearby cells 10 is selected from the BIM 550. Thereafter, the processing proceeds to operation 1015. In operation 1015 it is determined by accessing the channel usage table 560 if the potentially interfering cell has ongoing connections using the current time slot and the current frequency or a frequency adjacent to the current frequency. If no such ongoing connections exist then processing proceeds to operation 1055. Else the processing proceeds to operation 1020. In operation 1020 it is checked if the signal level of the selected interfering cell 10 is reported in a recent measurement report received from the mobile station 210 also containing the received signal level of the serving cell 10. This downlink measurement report may be contained in the channel usage table 560 or other suitable database. If it is determined that the interfering cell 10 is reported in the MR then processing proceeds to operation 1030 where the C/I ratio is set equal to that contained in the measurement report.

Still referring to FIG. 10, if in operation 1020 it is determined that the interfering cell signal level cell 10 is not reported in the measurement report then processing proceeds to operation 1025 where the C/I ratio is set equal to that found in the BIM 550. Either from operation 1025 or operation 1030 processing then proceeds to operation 1035 where the type of interference introduced is determined. If the interference is due to an adjacent frequency, then processing proceeds to operation 1040 where the C/I ratio is incremented by an adjacent channel protection margin that is a predetermined value. This adjacent channel protection margin is selected to reduce the C/I ratio to a level that corresponds to the detrimental impact of the adjacent channel interference if the interference would be regarded as co-channel interference. However, if in operation 1035 the type of interference is determined to be co-channel interference then processing proceeds to operation 1045 from either operation 1035 or 1040. In operation 1045 the C/I ratio is reduced by a transmission power level reduction value that corresponds to the current transmission power reduction implemented in the interfering connection by the power control function if it is used. This power reduction value can be available in the channel usage table 560 where it is updated by the power control function. This adjustment of the C/I ratio ensures that the impact of the possible power control functionality is taken into account in the C/I estimation procedure. Thereafter, processing proceeds to operation 1050 where the interference contribution of the currently examined interfering connection is summed to the overall interference level impacting the time slots and frequency that are currently being evaluated. Processing then proceeds to operation 1055 where it is determined if all the potentially interfering cells have been processed. If all the potentially interfering cells have not been processed then processing loops back to operation 1010. However, if all cells 10 have been processed then processing proceeds to operation 1060 where processing terminates.

Figure 11:
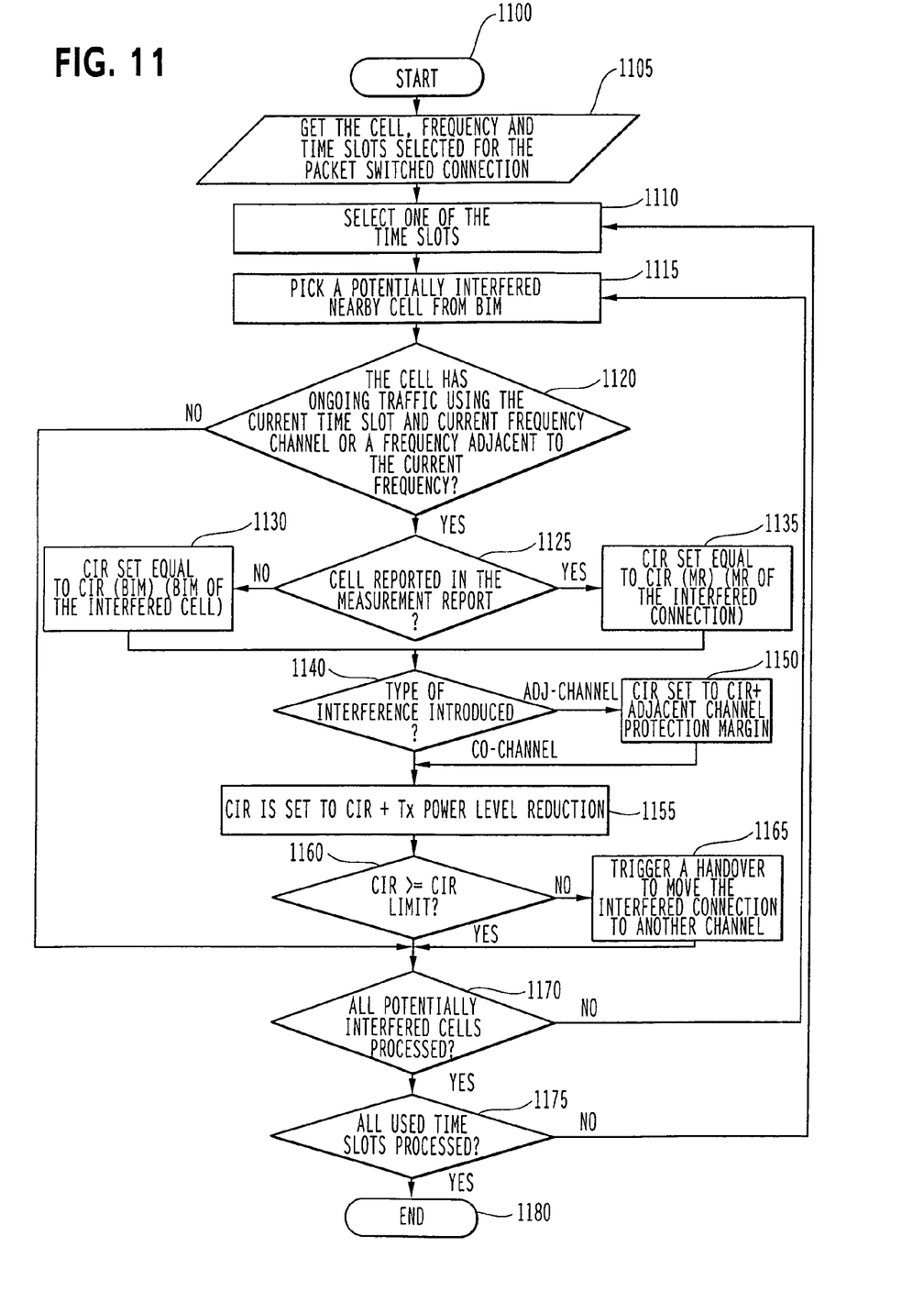
FIG. 11 is an example flowchart illustrating the operations performed by the outgoing interference evaluation module 530 shown in FIG. 5.

FIG. 11 is an example flowchart illustrating the operations performed by the outgoing interference evaluation module 530, shown in FIG. 5. The outgoing interference evaluation module 530 begins execution in operation 1100 and immediately proceeds to operation 1105. In operation 1105, the information of the cell 10, the time slots and the frequency that are to be used in the new channel assignment is accessed. Processing the proceeds to operation 1110 where one of the time slots that is to be used for the new connection is selected. Thereafter, the processing proceeds to operation 1115 where one of the potentially interfered nearby cells is selected for examination. The information of the potentially interfered nearby cells is available in BIM 550. In operation 1120 it is determined by accessing the channel usage table 560 if the potentially interfered cell has ongoing connections using the current time slot and the frequency used by the new connection or a frequency adjacent to the frequency used by the new connection. If no such ongoing connections exist then processing proceeds to operation 1170. Else the operation proceeds to operation 1125. In operation 1125 it is determined if the cell 10 where the new channel assignment is being performed is reported in the downlink measurement report (MR) of the connection that would be interfered by the new connection. This downlink measurement report may be contained in the frequency usage table 560 or other suitable database. If it is determined that the cell 10 where the new channel assignment is being performed is reported in the measurement report then processing proceeds to operation 1135 where the C/I ratio is set equal to that contained in the measurement report of the interfered connection.

Still referring to FIG. 11, if in operation 1125 it is determined that cell 10 where the new channel assignment is being performed is not reported in the MR then processing proceeds to operation 1130 where the C/I ratio is set equal to that found in the BIM 550. Either from operation 1130 or operation 1135 processing then proceeds to operation 1140 where it is identified if the interference caused to the existing connection is co-channel interference or adjacent channel interference. If the interference is due to an adjacent channel then processing proceeds to operation 1150 where the C/I ratio is incremented by an adjacent channel protection margin that is a predetermined value. This adjacent channel protection margin is selected to reduce the C/I ratio to a level corresponds to the detrimental impact of the adjacent channel interference if the interference would be regarded as co-channel interference. However, if in operation 1140 the type of interference is determined to be co-channel interference then processing proceeds to operation 1155 from either operations 1140 or 1150. In operation 745 the C/I ratio is reduced by a transmission power level reduction value that corresponds to the current transmission power reduction implemented in the interfering connection by the power control function if it is used. This power reduction value can be available in the channel usage table 560 where it is updated by the power control function. This adjustment of the C/I ratio ensures that the impact of the possible power control functionality is taken into account in the C/I estimation procedure. Processing then proceeds to operation 1160 where it is determined if the total C/I ratio exceeds or equals the permitted C/I ratio limit that is the minimum C/I ratio required for acceptable QoS for the interfered connection. If the C/I ratio is not greater than or equal to the C/I ratio limit then processing proceeds to operation 1165 where a handover is triggered in order to move the interfered connection to another channel. Either from operation 1160 or 1165 the processing then proceeds to operation 1170. In operation 1170 it is determined if all the potentially interfered cells 10 have been processed. If all potentially interfered cells 10 have not been processed then processing loops back to operation 1115. However, if all potentially interfered cells 10 have been processed then processing proceeds to operation 1175. In operation 1175, it is determined if all the time slots to be used for the new channel have been processed. If all such time slots have not been processed then processing loops back to operation 1110. Else, the processing proceeds to operation 1180 where it terminates.

Using the foregoing embodiments of the present invention, a mobile station of service provider can offer customers a wide array of services in a cellular network. For example, many customers may wish to simply have voice capability and e-mail capability on their mobile stations 210. The service provider could tailor a package so that dedicated channels would be allocated for voice transmission while shared channels would be utilized for e-mail. Other customers may specify a higher end service in which for example a streaming video or audio is required and therefore higher throughput with a guarantee of a certain minimum achievable throughput is needed. In this case the service provider could either supply a dedicated channel or shared channel with a limited number of users on it and a high C/I level specified. Further, the allocation of the types of channels may be dynamic based on traffic conditions and user needs. Therefore, the cellular network service provider can offer a wider array of enhanced services utilizing the same bandwidth with currently available for any given cell 10.

While we have shown and described only a few examples herein, it is understood that numerous changes and modifications as known to those skilled in the art could be made to the present invention. For example, the dynamic frequency management system 500 may be distributed anywhere within a cellular network or contain within the mobile station 210, transceiver 20, cell 10, BSC 230 or MSC 240. In addition, as previously described in DFCA, Nokia application number PCT/FI/01114, cyclical frequency hopping capability may be utilized in the present invention. Simply for the sake of simplicity the present invention has been described with out the utilization of cyclical frequency hopping. However, cyclical frequency hopping improves the quality of service reception noticed by the user at the mobile station. Thus, adding cyclical frequency hopping to the present invention would also improve the quality of service in the present invention. As described above, without cyclical frequency hopping, a radio channel is defined by the time slots and the frequency. However, with cyclical frequency hopping the frequency is replaced by the frequency list and the phase in the hopping sequence. The implementation of cyclical frequency hopping may done by simply substituting the term "frequency" in the specification for a "frequency list" and "the phase in the hopping sequence pair". Therefore, we do not wish to be limited to the details shown and described herein, but intend to cover all such changes modifications as are encompassed by the scope of the appended claims.

The invention claimed is:
1. An apparatus, comprising:
at least one processor; and
at least one memory including computer program code,
wherein the at least one memory and the computer program code are configured to, with the at least one processor, cause the apparatus to
determine when possible incoming interference with other assigned channels may occur and to derive time slot throughput estimates;
determine the effect of a channel assignment upon other channels already assigned within a cell and within nearby cells based upon a carrier to interference ratio; and
choose a shared or a dedicated channel for the connection based upon
a traffic class type associated with a mobile station or a service or an application requiring information transfer, and
throughput requirement of the channel assignment;
wherein the traffic class type comprises a best effort traffic class type configured to cause the channel assignment to be made to a shared channel, and a guaranteed traffic class type configured to cause the channel assignment to be made to a shared channel when adequate throughput exists on the shared channel;

wherein the at least one memory and the computer program code are configured to, with the at least one processor, cause the apparatus at least to evaluate the level of interference a new channel assignment is expected to cause on the other channels that have already been assigned to connections in a serving cell and the nearby cells;

wherein the at least one memory and the computer program code are configured to, with the at least one processor, cause the apparatus at least to trigger a radio channel re-assignment for the ongoing connections in the dedicated territory that are expected to be adversely affected based on a carrier to interference criteria by the interference resulting from the new channel assignment.

2. The system apparatus recited in claim 1, wherein the guaranteed traffic class type is configured to cause the channel assignment to be made to dedicated channel when adequate throughput does not exist on the shared channel.

3. The apparatus recited in claim 2, wherein the at least one memory and the computer program code are also configured to, with the at least one processor, cause the apparatus at least to assign frequencies used for the shared channels for each of a plurality of transceiver units based upon maximizing the carrier to interference ratio for each assigned frequency within each cell.

4. The apparatus recited in claim 3, wherein the frequency assignment module is configured to assign channels based upon a heuristic algorithm.

5. The apparatus recited in claim 2, wherein the at least one memory and the computer program code are configured to, with the at least one processor, cause the apparatus at least to assign, for each connection with a guaranteed throughput requirement, a minimum number of dedicated channels needed to satisfy the connection throughput requirement when the required throughput exceeds the capabilities of any shared channels.

6. The apparatus recited in claim 5, wherein when the assignment of a required number of dedicated channels exceeds the capacity of the cell or the capability of the mobile station the quality of the service requirements are configured to be renegotiated for the connection.

7. The apparatus recited in claim 2, wherein the at least one memory and the computer program code are configured to, with the at least one processor, cause the apparatus at least to produce throughput estimates for the available radio channels based on
 the estimated carrier to interference, and
 the available channel capacity to be used in the quality of service module for channel assignment of the decisions.

8. A method, comprising:
 dividing resources of a transceiver unit in a cell into shared channel resources forming a shared territory and dedicated channel resources forming a dedicated territory;
 allocating frequencies for the shared territories to a plurality of cells based upon minimizing the interference between the shared territories among the plurality of cells;
 transmitting the frequencies to each of the plurality of cells;
 receiving a request for a channel assignment from a mobile station or a core network, wherein a channel assignment comprises at least two of the frequencies;
 estimating the achievable throughputs in each of the possible radio channels based on the estimated carrier to interference and the channel capacity already used by other connections;
 determining a traffic class type for the channel assignment, wherein the traffic class type is either best effort or guaranteed;
 assigning the shared channel providing the highest estimated throughput when the traffic class type is best effort;
 assigning a dedicated channel able to provide the required throughput when the traffic class type is guaranteed and a shared channel assignment would generate inadequate throughput for the mobile station;
 evaluating outgoing interference that may result from the channel assignment impacting any existing connections in the serving cell or the nearby cells based upon the estimated post-assignment carrier to interference ratio for each existing connection; and
 initiating a channel re-assignment for the existing connections for which the carrier to interference ratio is estimated not to exceed a predetermined value.

9. The method as recited in claim 8, further comprising:
 renegotiating the quality of service for the connection when the estimated throughput available in all the available shared and dedicated channel combinations that are within the capabilities of the mobile station and the cell is insufficient to satisfy the required throughput.

10. The method as recited in claim 8, wherein identifying incoming interference further comprises determining whether the incoming interference is either due to an adjacent channel or a cochannel.

11. The method recited in claim 9, wherein the renegotiating all the quality of service for the mobile station comprises offering the mobile station a lower quality of service.

12. A computer program stored on a computer readable non-transitory medium and executable by a computer, comprising:
 a throughput estimation code segment configured to determine when possible interference with other assigned channels may occur and derive a throughput estimation for all available radio channels based upon a total carrier to interference ratio;
 an outgoing interference evaluation code segment configured to determine the effect of a channel assignment upon other channels already assigned within a cell and within nearby cells based upon a carrier to interference ratio; and
 a quality of service management code segment configured to monitor requests for channel assignment from the mobile station or the core network, and to allocate the channel assignment to either a dedicated channel or a shared channel based upon
  a traffic class type associated with the throughput requirements of the channel assignment, and
  the estimated available throughput on available shared and dedicated channel;
 wherein the traffic class type comprises a best effort traffic class type configured to cause the channel assignment to be made to a shared channel, and a guaranteed traffic class type configured to cause the channel assignment to be made to a shared channel when adequate throughput exists on the shared channel;
 wherein the outgoing interference evaluation code segment is further configured to evaluate the level of interference a new channel assignment is expected to cause on the other channels that have already been assigned to connections in a serving cell and the nearby cells;
 wherein the outgoing interference evaluation code segment is further configured to trigger a radio channel re-assignment for the ongoing connections in the dedicated territory that are expected to be adversely affected based on a carrier to interference criteria by the interference resulting from the new channel assignment.

13. The computer program recited in claim 12, wherein the traffic class type comprises
a best effort traffic class type configured to cause the channel assignment to be made to a shared channel, and
a guaranteed traffic class type configured to cause the channel assignment to be made to a shared channel when adequate throughput exists on the shared channel and configured to cause the channel assignment to be made to dedicated channel when adequate throughput does not exist on the shared channel.

14. The computer program recited in claim 13, further comprising:
a frequency assignment code segment configured to assign channels for each of the shared territories in a plurality of cells based upon calculating a carrier to interference ratio for each cell.

15. The computer program recited in claim 14, wherein the frequency assignment code segment is configured to assign channels based upon a heuristic algorithm.

16. The computer program recited in claim 13, wherein the quality of service management code segment is configured to minimize the number of assigned dedicated channels to a minimum required to provide the requested throughput when the throughput required for the channel assignment exceeds the capabilities of any shared channels.

17. The computer program recited in claim 16, wherein when the estimated throughput available in any of the available dedicated channels supported by the mobile station and the cell is not sufficient to satisfy the requested quality of service requirements the renegotiation of the quality of service requirements for the connection is configured to be initiated.

18. A method, comprising:
determining, in a device, when possible incoming interference with other assigned channels may occur and to derive time slot throughput estimates;
determine, in the device, the effect of a channel assignment upon other channels already assigned within a cell and within nearby cells based upon a carrier to interference radio;
choosing, by the device, a shared or a dedicated channel for the connection based upon
a traffic class type associated with a mobile station or a service or an application requiring information transfer, and
throughput requirement of the channel assignment;
wherein the traffic class type comprises a best effort traffic class type configured to cause the channel assignment to be made to a shared channel, and a guaranteed traffic class type configured to cause the channel assignment to be made to a shared channel when adequate throughput exists on the shared channel;
evaluating the level of interference a new channel assignment is expected to cause on the other channels that have already been assigned to connections in a serving cell and the nearby cells;
triggering re-assignment for the ongoing connections in the dedicated territory that are expected to be adversely affected based on a carrier to interference criteria by the interference resulting from the new channel assignment.

* * * * *